US008370698B2

(12) United States Patent
Choi et al.

(10) Patent No.: US 8,370,698 B2
(45) Date of Patent: Feb. 5, 2013

(54) INTERLEAVING APPARATUS FOR IMPROVING TRANSMISSION PERFORMANCE AND INTERLEAVING METHOD USED BY THE INTERLEAVING APPARATUS

(75) Inventors: Seung-Nam Choi, Daejeon-si (KR); Il-Gyu Kim, Okcheon-gun (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 298 days.

(21) Appl. No.: 12/846,186

(22) Filed: Jul. 29, 2010

(65) Prior Publication Data

US 2011/0142157 A1 Jun. 16, 2011

(30) Foreign Application Priority Data

Dec. 15, 2009 (KR) ........................ 10-2009-0124650

(51) Int. Cl.
*G06F 11/00* (2006.01)

(52) U.S. Cl. ........................................ 714/749; 714/750

(58) Field of Classification Search .................. 714/749, 714/748, 756, 750, 751
See application file for complete search history.

(56) References Cited

U.S. PATENT DOCUMENTS

| | | | | |
|---|---|---|---|---|
| 6,959,049 | B2 * | 10/2005 | Staszewski et al. | 375/316 |
| 7,433,425 | B1 * | 10/2008 | Lou et al. | 375/316 |
| 7,555,065 | B1 * | 6/2009 | Lou et al. | 375/316 |
| 2004/0076188 | A1 * | 4/2004 | Milbar et al. | 370/514 |
| 2010/0226443 | A1 * | 9/2010 | Citta et al. | 375/240.26 |

* cited by examiner

*Primary Examiner* — Dieu-Minh Le
(74) *Attorney, Agent, or Firm* — Kile Park Goekjian Reed & McManus PLLC

(57) ABSTRACT

Provided are an interleaving apparatus for improving transmission performance and an interleaving method used by the interleaving apparatus. The interleaving apparatus determines the type of data at each element position of an interleaving matrix, reads encoded data, which corresponds to the determined type of data at each element position, from an encoder, rearranges the read data in an order determined by the interleaving matrix, and outputs the rearranged data. Since the interleaving apparatus does not include a memory, it can prevent delay in signal processing, thereby improving transmission performance.

16 Claims, 13 Drawing Sheets

FIG. 5A c0 c1 c2 c3 c4 c5 c6 c7 c8 c9 c10 c11 row_bk

4 S 16 17
3 12 15 14 13
2 8 11 10 9
1 4 7 6 5
0 0 3 2 1 r0 r1 r2 r3 r4

FIG. 5B row_bk

| | c0 | c1 | c2 | c3 | c4 | c5 | c6 | c7 | c8 | c9 | c10 | c11 |
|---|---|---|---|---|---|---|---|---|---|---|---|---|
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| 4 | | 16 | | | | | | | | | 17 | |
| 3 | S | 12 | | | 15 | | | 14 | | | 13 | |
| 2 | | 8 | | | 11 | | | 10 | | | 9 | |
| 1 | | 4 | | | 7 | | | 6 | | | 5 | |
| 0 | | 0 | | | 3 | | | 2 | | | 1 | |
| | r0 | r1 | | | r2 | | | r3 | | | r4 | |

FIG. 5C

FIG. 5D c0 c1 c2 c3 c4 c5 c6 c7 c8 c9 c10 c11 row_bk 4 3 2 1 0

INTERLEAVING APPARATUS FOR IMPROVING TRANSMISSION PERFORMANCE AND INTERLEAVING METHOD USED BY THE INTERLEAVING APPARATUS

CROSS-REFERENCE TO RELATED APPLICATION

This application claims the benefit under 35 U.S.C. §119 (a) of a Korean Patent Application No. 10-2009-0124650, filed on Dec. 15, 2009, the entire disclosure of which is incorporated herein by reference for all purposes.

BACKGROUND

1. Field

The following description relates to an interleaving processing technology for improving transmission performance of a mobile communication system.

2. Description of the Related Art

One of the major advantages of a digital communication system is that data can be transmitted without distortion due to noise as long as "zero"s and "one"s can clearly be distinguished from one another. However, if these values are changed due to severe instantaneous noise, a mobile communication system can make more serious errors than its analog counterpart.

One method commonly used to increase resistance to this instantaneous noise is interleaving. Interleaving is performed to rearrange the order of each predetermined portion of a transmitted data stream so that bits lost from the middle of the data stream due to instantaneous noise can be recovered. This is a channel coding method used to prevent deterioration of a received signal due to burst errors that may occur in a wireless channel.

A conventional interleaver includes a memory, and interleaved data is output from the memory only when the memory is filled with the interleaved data. Accordingly, data processing is delayed while data is recorded on the memory. In the case of high-speed data transmission, this delay in data processing causes deterioration of transmission performance and thus needs to be remedied.

SUMMARY

It is an objective of the present invention to provide an interleaving apparatus which does not include a memory to prevent delay in signal processing during interleaving and thus to improve transmission performance and an interleaving method used by the interleaving apparatus.

In one general aspect, the type of data at each element position of an interleaving matrix is determined, encoded data, which corresponds to the determined type of data at each element position, is read from an encoder, the read data is rearranged in an order determined by the interleaving matrix, and the rearranged data is output.

Other features and aspects will be apparent from the following detailed description, the drawings, and the claims.

BRIEF DESCRIPTION OF THE DRAWINGS

FIGS. 5A through 5H are diagrams illustrating how a channel quality information (CQI) data memory read address value and a shared channel (SCH) data memory read address value are determined.

Figure 1:
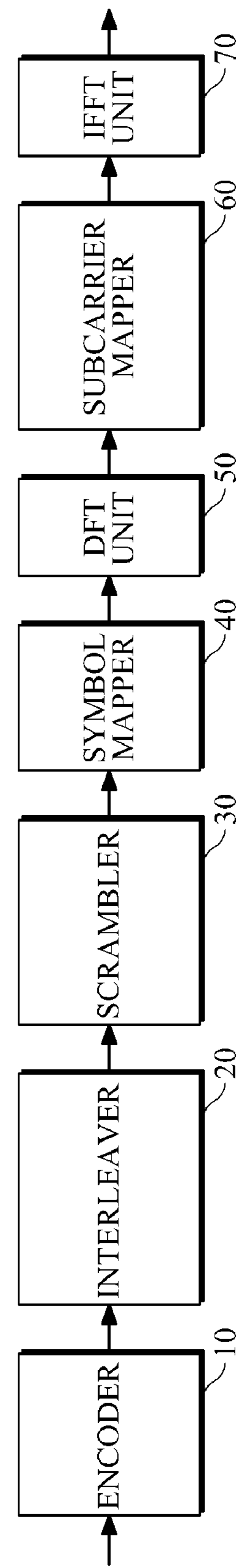
FIG. 1 is a block diagram of a conventional modulator included in a mobile terminal.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The invention is described more fully hereinafter with reference to the accompanying drawings, in which exemplary embodiments of the invention are shown. Descriptions of well-known functions and constructions are omitted to increase clarity and conciseness. Also, the terms used in the following description are terms defined taking into consideration the functions obtained in accordance with the present invention, and may be changed in accordance with the option of a user or operator or a usual practice. Therefore, the definitions of these terms should be determined based on the entire content of this specification.

FIG. 1 is a block diagram of a conventional modulator included in a mobile terminal. Referring to FIG. 1, an input signal is encoded by an encoder 10, interleaved by an interleaver 20, and scrambled by a scrambler 30.

Then, the scrambled signal is mapped by a symbol mapper 40 using a modulation scheme, such as quadrature phase shift keying (QPSK) or quadrature amplitude modulation, and discrete-Fourier-transformed by a discrete Fourier transform (DFT) unit 50.

The discrete-Fourier-transformed signal is mapped to a desired frequency domain signal by a subcarrier mapper 60 and then inverse-fast-Fourier-transformed by an inverse fast Fourier transform (IFFT) unit 70 into a time domain signal.

Mobile terminals for high-speed mobile communication interleave various types of data and transmit the interleaved data at high speed. In the case of a third generation partnership project long-term evolution (3GPP LTE) system, examples of data that is transmitted after being interleaved include shared channel (SCH) data, channel quality information (CQI) data, rank indication (RI) data, and acknowledgement (ACK)/negative acknowledgement (NACK) data.

Figure 2:
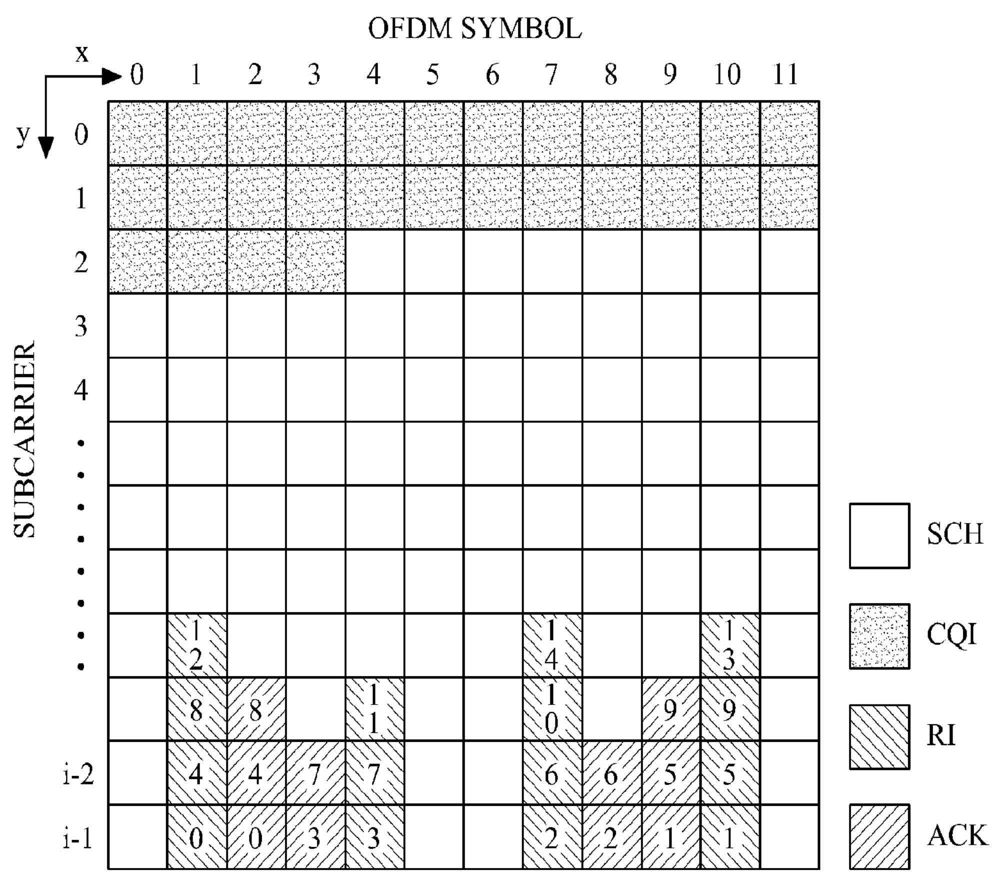
FIG. 2 is a diagram illustrating an interleaving method used in a third generation partnership project long-term evolution (3GPP LTE) system.

FIG. 2 is a diagram illustrating an interleaving scheme used in a 3GPP LTE system. In FIG. 2, the horizontal axis is the time domain and represents the orthogonal frequency division multiplexing (OFDM) symbol index. 10 or 12 OFDM symbol indices may exist depending on is the radius of a cell. The vertical axis represents the subcarrier index which corresponds to a transmission frequency band allocated to a modulator.

ACK data is 1 or 2-bit data. The total number of encoded bits is $Q_{ACK}$, and an encoded bit stream is expressed as $q_0^{ACK}, q_1^{ACK}, q_2^{ACK}, \ldots, q_{Q_{ACK}-1}^{ACK}$. A vector output of encoded ACK data may be expressed as $q_0^{ACK}, q_1^{ACK}, \ldots, q_{Q'_{ACK}-1}^{ACK}$, where $Q'_{ACK}=Q_{ACK}/Q_m$, and $Q_m$ is the number of bits according to a modulation scheme.

When the modulation scheme is QPSK, $Q_m=2$. In the case of 16 quadrature amplitude modulation (QAM) and 64 QAM, $Q_m=4$ and $Q_m=6$, respectively. An algorithm for generating a vector sequence of the ACK data is as follows.

Set i, k to 0 while $i<Q_{ACK}$ $$\underline{q}_k^{ACK}=[q_i^{ACK}\ldots q_{i+Q_m-1}^{ACK}]^T$$

$i=i+Q_m$ $k=k+1$ end while

RI data is 1 or 2-bit data. The total number of encoded bits is $Q_{RI}$, and an encoded bit stream is expressed as $q_0^{RI}$, $q_1^{RI}$, $q_2^{RI}$, . . . , $q_{Q_{RI}-1}^{RI}$. A vector output of encoded RI data may be expressed as $\underline{q}_0^{RI}$, $\underline{q}_1^{RI}$, . . . , $\underline{q}_{Q'_{RI}-1}^{RI}$, where $Q'_{RI}=Q_{RI}/Q_m$, and $Q_m$ is the number of bits according to a modulation scheme. An algorithm for generating a vector sequence of the RI data is as follows.

Set i, k to 0 while $i<Q_{RI}$ $$\underline{q}_k^{RI}=[q_i^{RI}\ldots q_{i+Q_m-1}^{RI}]^T$$

$i=i+Q_m$ $k=k+1$ end while

The total number of encoded bits of CQI data is Q, and the total number of encoded bits of SCH data is G. A bit stream $f_0$, $f_1$, $f_2$, $f_3$, . . . , $f_{G-1}$ of encoded SCH data is multiplexed with a bit stream $q_0$, $q_1$, $q_2$, $q_3$, . . . , $q_{Q-1}$ of encoded CQI data. A multiplexed output bit stream is $\underline{g}_0$, $\underline{g}_1$, $\underline{g}_2$, $\underline{g}_3$, . . . , $\underline{g}_{H'-1}$. $H=(G+Q)$, $H'=H/Q_m$, and $\underline{g}_i$ ($i=0$, . . . , $H'-1$) is a column vector with a length of $Q_m$.

An algorithm for multiplexing the CQI data is as follows.

Set i, j, k to 0 while $j<Q$ $$\underline{g}_k=[q_j\ldots q_{j+Q_m-1}]^T$$

$j=j+Q_m$ $k=k+1$ end while

An algorithm for multiplexing the SCH data is as follows.

while $i<G$ $$\underline{g}_k=[f_i\ldots f_{i+Q_m-1}]^T$$

$i=i+Q_m$ $k=k+1$ end while

The encoded ACK data, the encoded RI data, the encoded CQI data, and the encoded SCH data are interleaved as follows. Inputs to an interleaver are $\underline{g}_0$, $\underline{g}_1$, $\underline{g}_2$, . . . , $\underline{g}_{H'-1}$, $\underline{q}_0^{RI}$, $\underline{q}_1^{RI}$, $\underline{q}_2^{RI}$, . . . , $\underline{q}_{Q'_{RI}-1}^{RI}$, and $\underline{q}_0^{ACK}$, $\underline{q}_1^{ACK}$, $\underline{q}_2^{ACK}$, . . . , $\underline{q}_{Q'_{ACK}-1}^{ACK}$. The interleaver may be expressed in the form of a matrix, and the entire space in which data in the matrix can be transmitted may be a subframe. That is, the size of the interleaver may be equal to that of the subframe. The total number of modulation symbols in the subframe is $H''=H'+Q'_{RI}$. An output bit sequence of the interleaver is determined as follows.

(1) $C_{mux}$ is the number of columns of the subframe (or the matrix). The columns of the subframe are sequentially numbered 0, 1, 2, . . . , $C_{mux}-1$, from left to right.

(2) The number of rows of the subframe is $R_{mux}=(H''\cdot Q_m)/C_{mux}$, and $R'_{mux}=R_{mux}/Q_m$. The rows of the subframe are sequentially numbered 0, 1, 2, . . . , $R_{mux}-1$, from top to bottom.

(3) When the interleaver sends the RI data to the subframe, a vector sequence $\underline{q}_0^{RI}$, $\underline{q}_1^{RI}$, $\underline{q}_2^{RI}$, . . . , $\underline{q}_{Q'_{RI}-1}^{RI}$ is written to a column set {1, 4, 7, 10} of the subframe, starting with a last row of the subframe, by using the following algorithm.

Set i, j to 0

Set r to $R'_{mux}-1$ while $i<Q'_{RI}$ $c_{RI}$=Column Set(j)

$$\underline{y}_{r\times C_{mux}+c_{RI}}=\underline{q}_i^{RI}$$

$i=i+1$ $r=R'_{mux}-1-\lfloor i/4\rfloor$ $j=(j+3)\bmod 4$ end while (4) An input vector sequence $\underline{y}_k=\underline{g}_k$ ($k=0, 1, \ldots, H'-1$) is written to the following $(R_{mux}\times C_{mux})$ matrix of the interleaver in the column direction, starting with a vector $\underline{y}_0$ of column 0. Here, positions already written are skipped.

$$\begin{bmatrix} \underline{y}_0 & \underline{y}_1 & \underline{y}_2 & \cdots & \underline{y}_{C_{max}-1} \\ \underline{y}_{C_{max}} & \underline{y}_{C_{max}+1} & \underline{y}_{C_{max}+2} & \cdots & \underline{y}_{2C_{max}-1} \\ \vdots & \vdots & \vdots & \ddots & \vdots \\ \underline{y}_{(R'_{max}-1)\times C_{max}} & \underline{y}_{(R'_{max}-1)\times C_{max}+1} & \underline{y}_{(R'_{max}-1)\times C_{max}+2} & \cdots & \underline{y}_{(R'_{max}\times C_{max}-1)} \end{bmatrix}$$

(5) When the interleaver sends the ACK data to the subframe, a vector sequence $\underline{q}_0^{ACK}$, $\underline{q}_1^{ACK}$, $\underline{q}_2^{ACK}$, . . . , $\underline{q}_{Q'_{ACK}-1}^{ACK}$ is written to a column set {2, 3, 8, 9} of the subframe, starting with the last row of the subframe, by using the following algorithm. Here, positions written in is operation (4) are overwritten.

Set i, j to 0

Set r to $R'_{mux}-1$ while $i<Q'_{ACK}$ $c_{ACK}$=Column Set(j)

$$\underline{y}_{r/C_{mux}+C_{ACK}}=\underline{q}_i^{ACK}$$

$i=i+1$ $r=R'_{mux}-1-\lfloor i/4\rfloor$ $j=(j+3)\bmod 4$ end while (6) An output of the interleaver is a bit sequence obtained by reading the $(R_{mux}\times C_{mux})$ matrix in the column direction. An interleaved bit stream is $h_0$, $h_1$, $h_2$, . . . , $h_{H+Q_{RI}-1}$, and the total number of output bits is $G+Q+Q_{RI}$.

Figure 3:
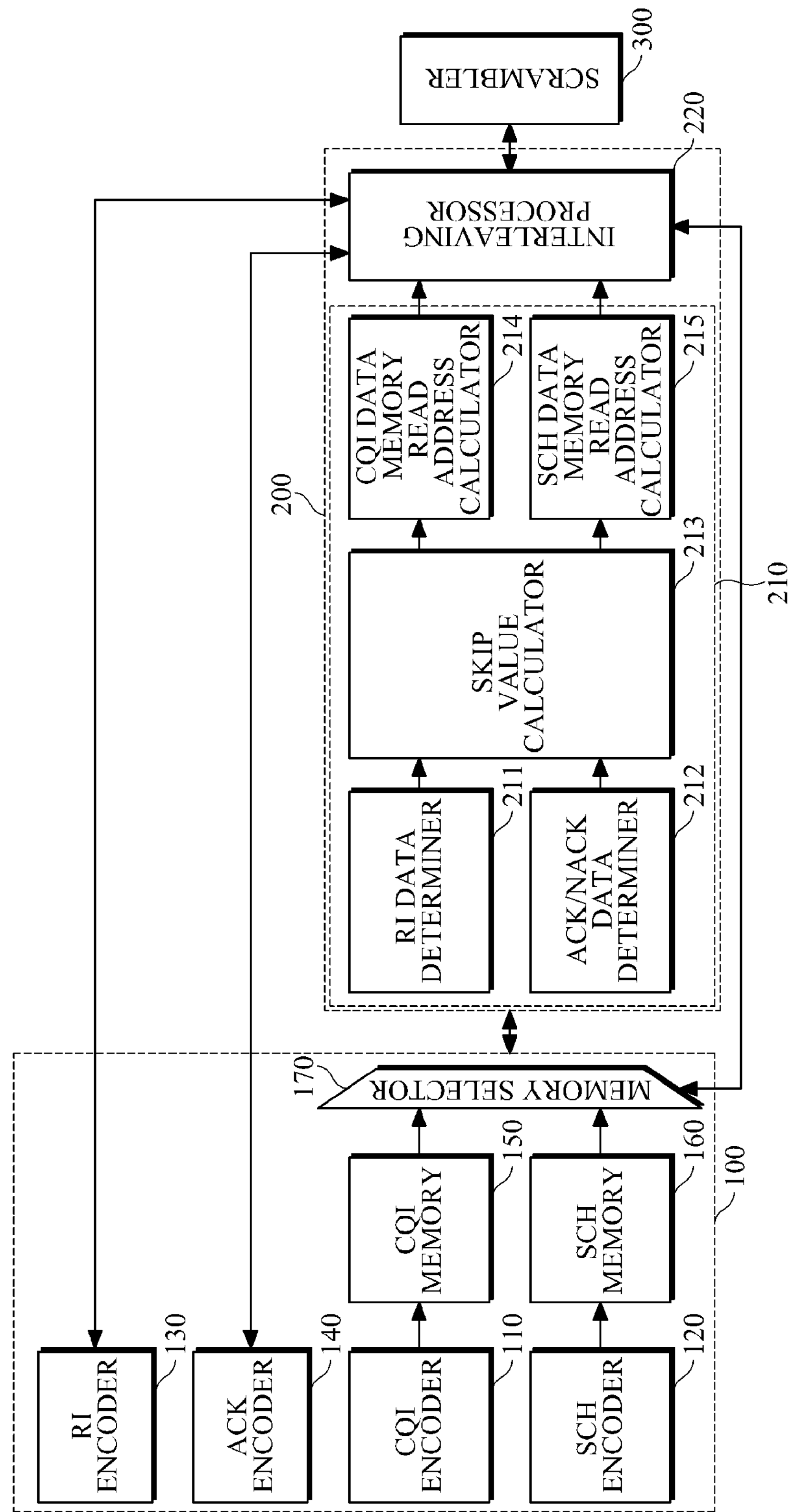
FIG. 3 is a block diagram of an example interleaving apparatus for improving transmission performance.

To implement the above interleaver, a memory for storing data is required. Specifically, a memory with a size of $(R_{mux}\times Q_m)$ is required for each column, and a memory write address should be controlled properly to store data in each memory. The interleaver may experience a delay in signal processing during interleaving. Here, the delay time increases as the size of the matrix of the interleaver is increased. The interleaver needs a memory corresponding to the maximum size of the matrix. The exclusion of a memory in the interleaver prevents delay in signal processing and thus improves transmission performance FIG. 3 is a block diagram of an example interleaving apparatus 200 for improving transmission performance. Referring to FIG. 3, the example interleaving apparatus 200 includes a determiner 210 and an interleaving processor 220.

The determiner 210 determines the type of data at each element position of a matrix for interleaving (hereinafter, referred to as an interleaving matrix). Here, the determiner 210 may determine the type of data at each element position of the interleaving matrix based on position information of each element of the interleaving matrix and the number of data symbols.

The determiner 210 may include an RI data determiner 211, an ACK/NACK data determiner 212, a skip value calculator 213, a CQI data memory read address calculator 214, and an SCH data memory read address calculator 215.

The RI data determiner 211 determines whether a current element position is an RI data position. For example, the RI data determiner 211 may receive the number of RI data symbols and the position information of each element of the interleaving matrix and determine whether the current element position is the RI data position based on the received information.

The ACK/NACK data determiner 212 determines whether the current element position is an ACK/NACK data position. For example, the ACK/NACK data determiner 212 may receive the number of ACK/NACK data symbols and the position information of each element of the interleaving matrix and determine whether the current element position is the ACK/NACK data position based on the received information.

When the RI data determiner 211 and the ACK/NACK data determiner 212 determines that the current element position is neither the RI data position nor the ACK/NACK data position, the skip value calculator 213 calculates a skip value needed to calculate a memory read address value. Here, the skip value calculated by the skip value calculator 213 may be the number of pieces of RI data existing at element positions before the current element position of the interleaving matrix.

The CQI data memory read address calculator 214 calculates a CQI data memory read address value using the skip value calculated by the skip value calculator 213. If the CQI data memory read address value is less than the number of vector symbols of CQI data, the skip value calculated by the skip value calculator 213 must be subtracted from the CQI data memory read address value.

For example, the CQI data memory read address value calculated by the CQI data memory read address calculator 214 may be a value obtained by multiplying a row number of the current element position by the total number of columns, adding the multiplication result to a column number of the current element position, and subtracting an accumulated skip value from the addition result.

The SCH data memory read address calculator 215 calculates an SCH data memory read address value using the skip value calculated by the skip value calculator 213. When the SCH data memory read address value is greater than the number of vector symbols of the CQI data, the skip value calculated by the skip value calculator 213 and the number of vector symbols of the CQI data may be subtracted from the SCH data memory read address value to produce a new read address value.

For example, the SCH data memory read address value calculated by the SCH data memory read address calculator 215 may be a value obtained by subtracting the number of vector symbols of encoded CQI data from the CQI data memory read address value.

The interleaving processor 220 reads encoded data, which corresponds to the type of data at each element position determined by the determiner 210, from an encoder 100, rearranges the read data in the order determined by the interleaving matrix, and outputs the rearranged data.

Here, when the RI data determiner 211 determines that the current element position is the RI data position, the interleaving processor 220 reads RI data as soon as the encoder 100 encodes the RI data.

When the ACK/NACK data determiner 212 determines that the current element position is the ACK/NACK data position, the interleaving processor 220 reads ACK/NACK data as soon as the encoder 100 encodes the ACK/NACK data.

Meanwhile, the interleaving processor 220 reads CQI data from a position in a CQI memory 150 of the encoder 100 which corresponds to the CQI data memory read address value calculated by the CQI data memory read address calculator 214.

In addition, the interleaving processor 220 reads SCH data from a position in an SCH memory 160 of the encoder 100 which corresponds to the SCH data memory read address value calculated by the SCH data memory read address calculator 215.

To this end, the CQI data and the SCH data should be encoded by the encoder 100 and stored in the CQI memory 150 and the SCH memory 160, respectively.

As described above, since the example interleaving apparatus 200 does not include a memory, it can prevent delay in signal processing during interleaving, thereby improving transmission performance.

In FIG. 3, a CQI encoder 110 which encodes the CQI data, an SCH encoder 120 which encodes the SCH data, an RI encoder 130 which encodes the RI data, an ACK/NACK encoder 140 which encodes the ACK/NACK data, a memory selector 170 which selects the CQI memory 150 or the SCH memory 160, and a scrambler 300 are also illustrated.

Figure 4:
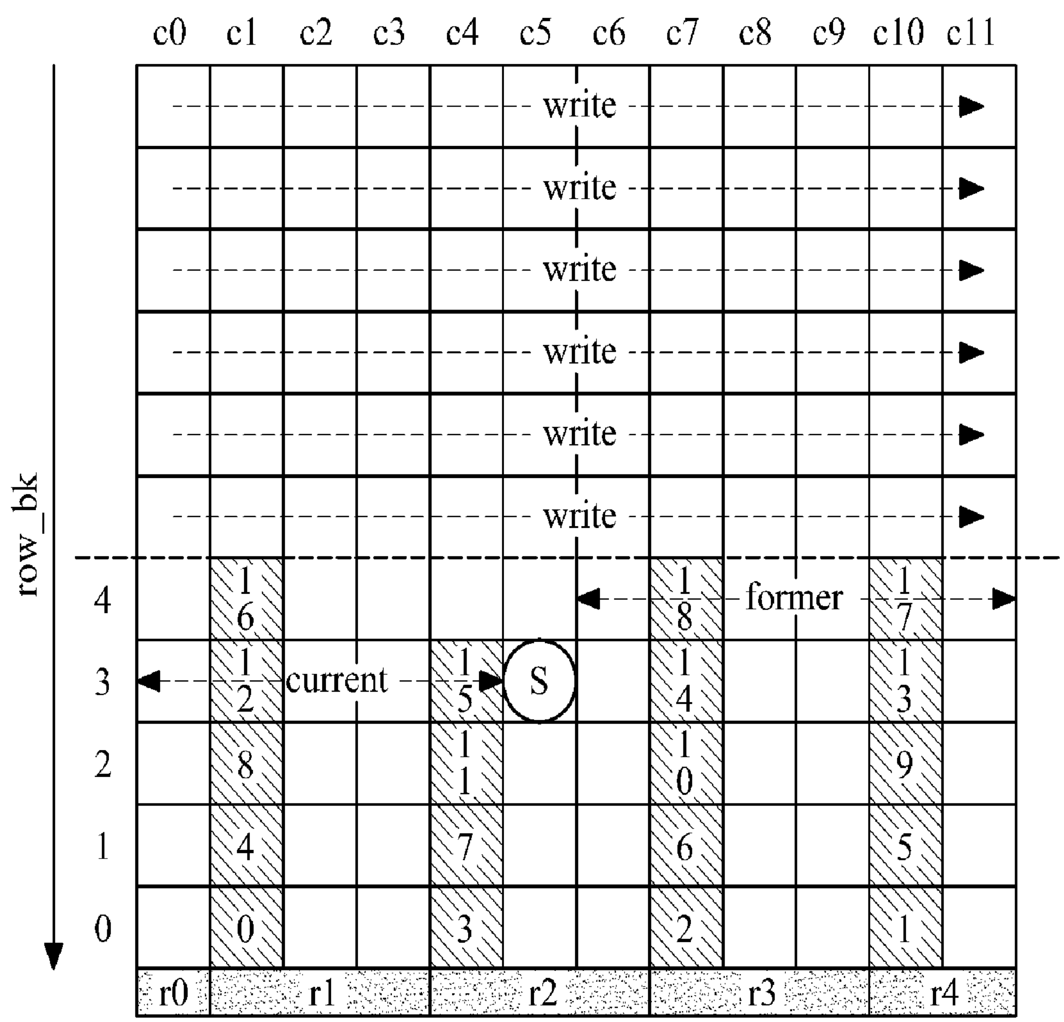
FIG. 4 is a diagram illustrating an interleaving matrix.

The interleaving operation of the interleaving apparatus 200 illustrated in FIG. 3 will now be described with reference to FIG. 4. FIG. 4 is a diagram illustrating an interleaving matrix. The CQI data and the SCH data are, in advance, encoded and stored respectively in the CQI memory 150 and the SCH memory 160 of the encoder 100. On the other hand, since the encoding process of the RI data and the ACK/NACK data is simple, the RI data and the ACK/NACK data are output from the encoder 100 as soon as they are encoded by the encoder 100. That is, the RI data and the ACK/NACK data are output from the encoder 100 without being stored in separate memories.

The interleaving apparatus 200 determines whether each element position of the interleaving matrix is the ACK/NACK data position, the RI data position, the CQI data position, or the SCH data position by increasing the row number of the interleaving matrix while maintaining the column number unchanged and performs data processing based on the determination result.

(1) The RI data determiner 211 determines whether a current element position of the interleaving matrix is the RI data position based on the row and column numbers of the current element position. When the RI data determiner 211 determines that the current element position is the RI data position, the interleaving processor 220 reads the RI data as soon as the encoder 100 encodes the RI data.

(2) The ACK/NACK data determiner 212 determines whether the current element position is the ACK/NACK data position based on the row and column numbers of the current element position. When the ACK/NACK data determiner 212 determines that the current element position is the ACK/NACK data position, the interleaving processor 220 reads the ACK/NACK data as soon as the encoder 100 encodes the ACK/NACK data.

(3) When the current element position is neither the ACK/NACK data position nor the RI data position, the interleaving processor 220 reads the CQI data from the CQI memory 150 of the encoder 100. The CQI data memory read address value may vary according to the row number, the column number, and the number of pieces of RI data at element positions before the current element position. The CQI data memory read address value is calculated by the CQI data memory read address calculator 214.

(4) When the current element position is neither the ACK/NACK data position nor the RI data position, the interleaving processor 220 reads the CQI data from the CQI memory 150 of the encoder 100 and then reads the SCH data from the SCH memory 160 of the encoder 100. The SCH data memory read address value may vary according to the row number, the column number, and the number of pieces of RI data at the element positions before the current element position. The SCH data memory read address value is calculated by the SCH data memory read address calculator 215.

When the CQI data and the SCH data are read from the CQI memory 150 and the SCH memory 160 as described above, the skip value calculator 213 may determine the number of pieces of RI data at the element positions before the current element position of the interleaving matrix and calculate a skip value based on the determined number of pieces of RI data as follows.

(1) 'Region' of a current element position is determined.

If the column number of a current element position S is c0, region=r0.

If the column number of the current element position S is c1-c3, region=r1.

If the column number of the current element position S is c4-c6, region=r2.

If the column number of the current element position S is c7-c9, region=r3.

If the column number of the current element position S is c10-c11, region=r4.

(2) A 'former' value is calculated.

'Former' is defined as the number of pieces of RI data existing in a row indicated by a row number, which is one less than the row number of the current element position S, and in columns indicated by column numbers which are greater than the column number of the current element position S. In addition, 'row_bk' represents reverse row numbers.

The total number of rows in which the RI data exists may be nrow_ri=$Q'_{RI}/4$, and the number of pieces of RI data existing in a last row in which the RI data exists may be nrem_ri=$Q'_{RI}$ mod 4. In this case, (2-1) when row_bk+1 is equal to nrow_ri and when nrem_ri is not zero, if region=r0, former=nrem_ri,
if region=r1, former=nrem_ri−1,
if region=r2 and nrem_ri>1, former=nrem_ri−1,
if region=r2 and nrem_ri=1, former=0,
if region=r3 and nrem_ri>1, former=1,
if region=r3 and nrem_ri=1, former=0, and
if region=r4, former=0.

(2-2) When row_bk+1 is smaller than nrow_ri, if region=r0, former=4,
if region=r1, former=3,
if region=r2, former=2,
if region=r3, former=1, and
if region=r4, former=0.

(3) A 'current' value is calculated.

'Current' is defined as the number of pieces of RI data existing in a row indicated by the row number of the current element position S and in columns indicated by column numbers which are smaller than the column number of the current element position S.

(3-1) When row_bk is equal to nrow_ri and when nrem_ri is not zero 0, if region=r1, current=1,
if region=r2, current=1,
if region=r3 and nrem_ri>1, current=nrem_ri−1,
if region=r3 and nrem_ri=1, current=1, and
if region=r4, current=nrem_ri.

(3-2) When row_bk is smaller than nrow_ri, if region=r1, current=1,
if region=r2, current=2,
if region=r3, current=3, and
if region=r4, current=4.

(4) The skip value is equal to 'former'+'current'.

Through the above process, the CQI data memory read address value and the SCH data memory read address value are determined for each column based on the 'former' value and the 'current' value.

FIGS. 5A through 5H are diagrams specifically illustrating how the 'former' and 'current' values are calculated and how the CQI and SCH data memory read address values are determined.

The number of pieces of RI data hatched in FIGS. 5A through 5H is 18. Here, 'row_bk' represents reverse row numbers, and a skip value represents the number of pieces of RI data skipped from a current element position S. In addition, 'acc_skip' represents a value obtained by adding current and previous skip values. For each column, the current element position S is moved on a row-by-row basis along the vertical axis, starting with a row number 0. The vertical axis is the direction in which interleaving results are output.

Figure 5A:
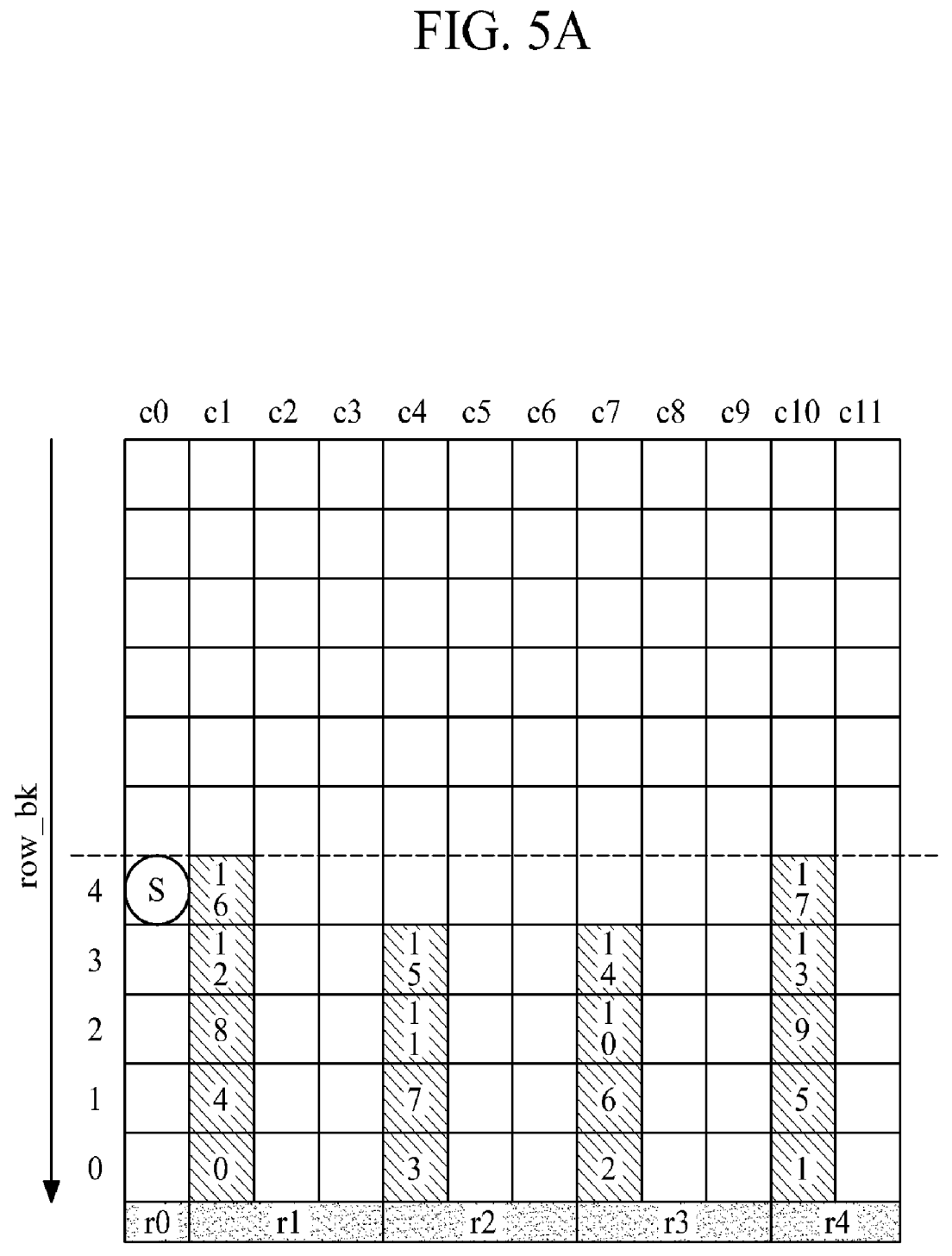
Figure 5B:
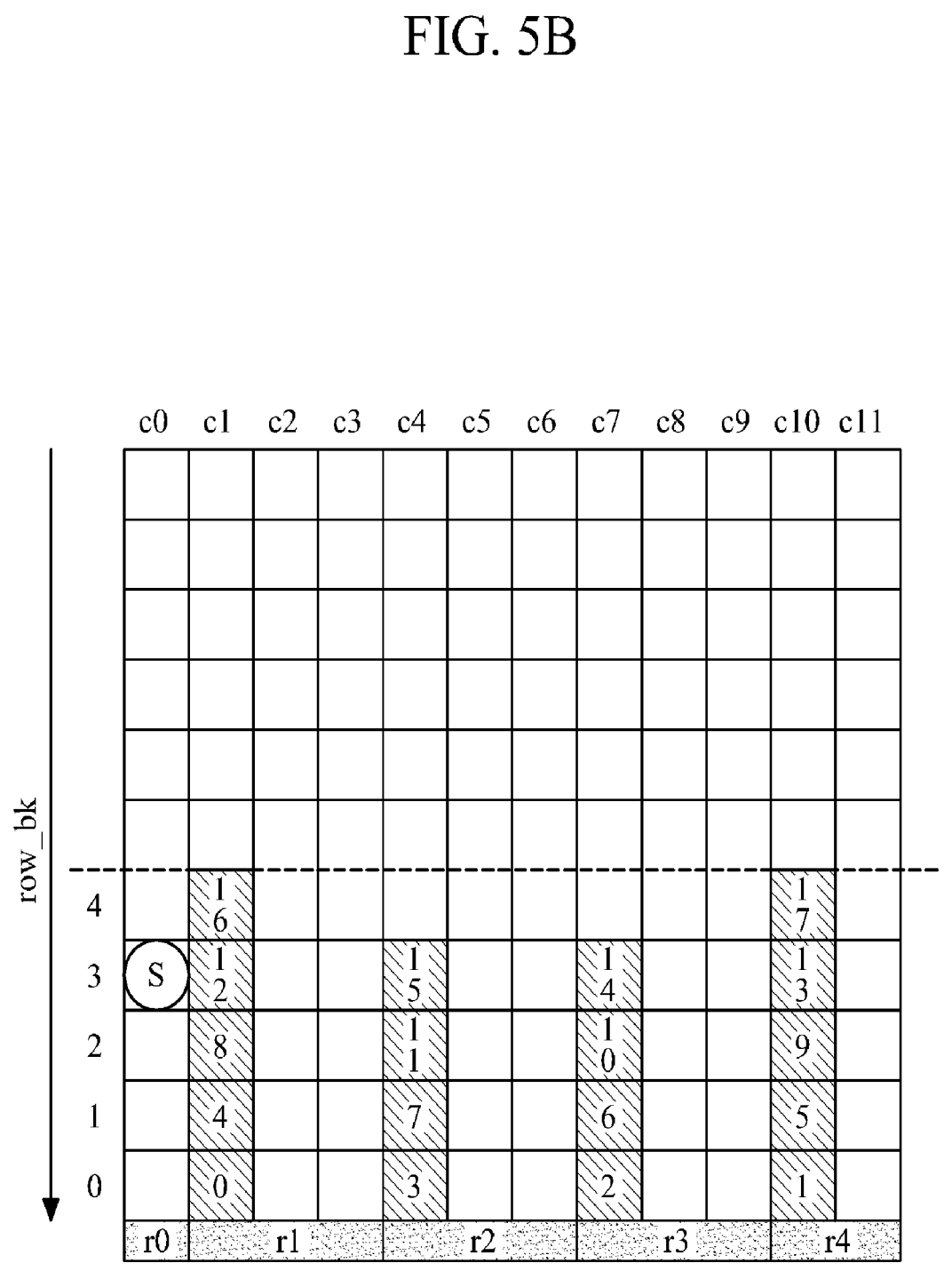
Figure 5C:
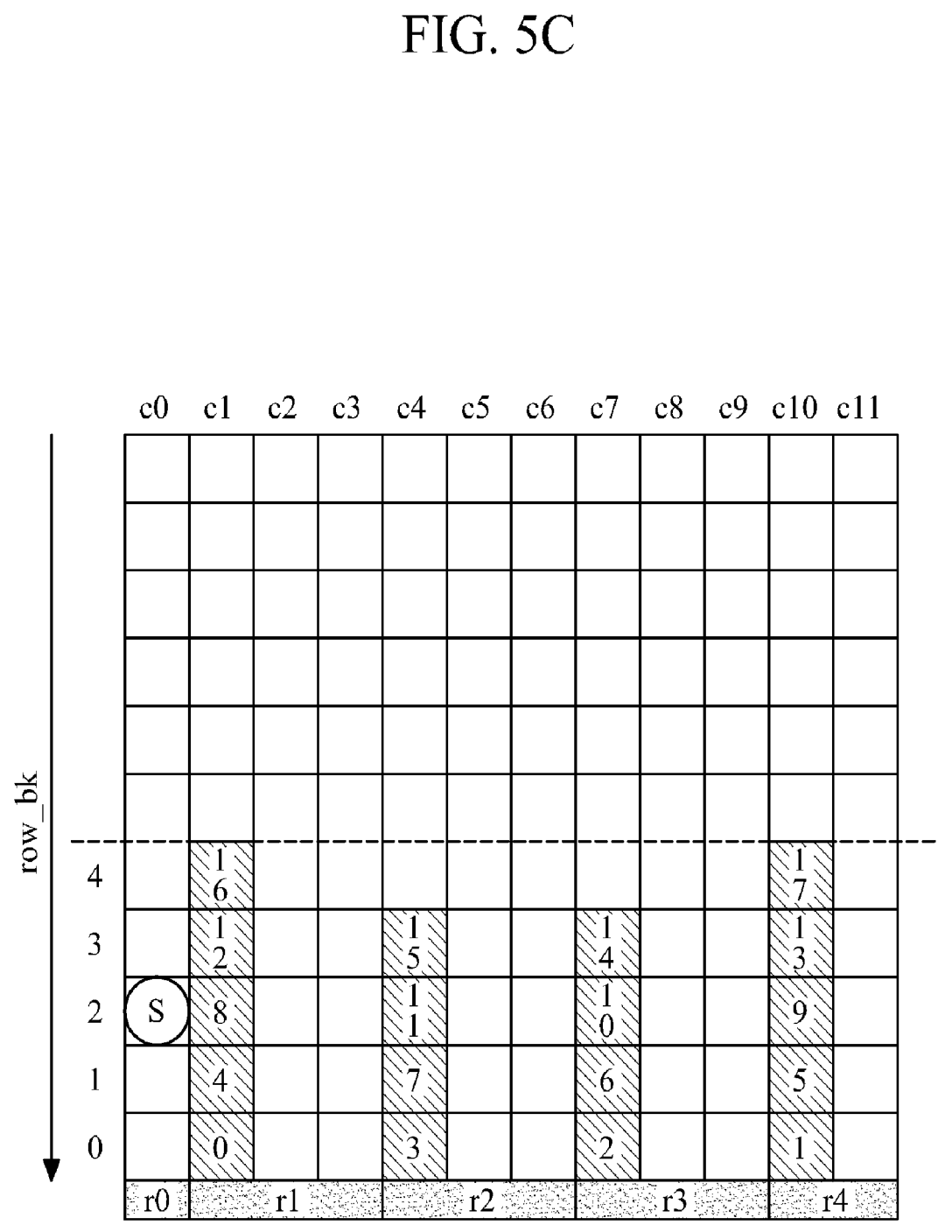
Figure 5D:
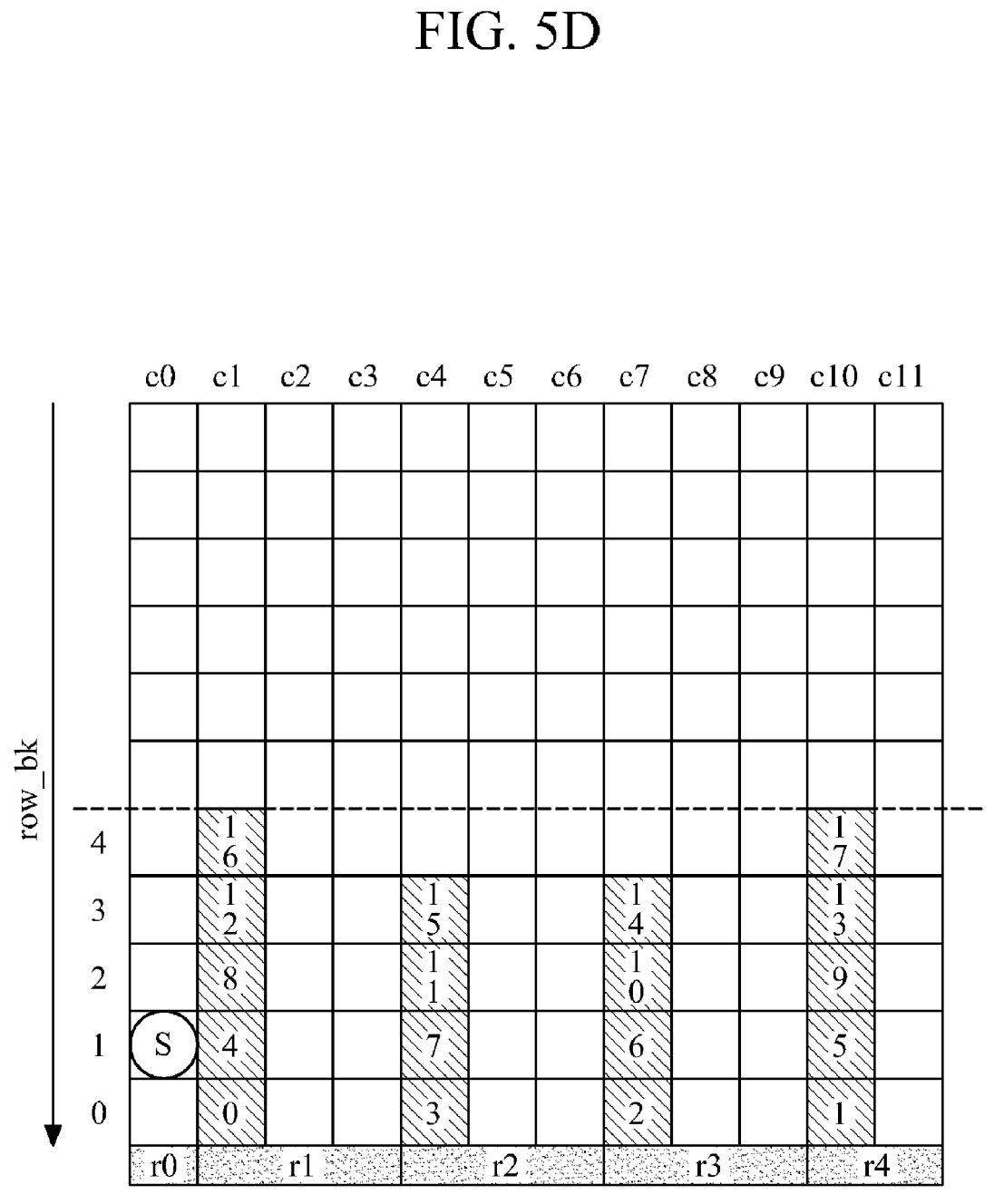
Figure 5E:
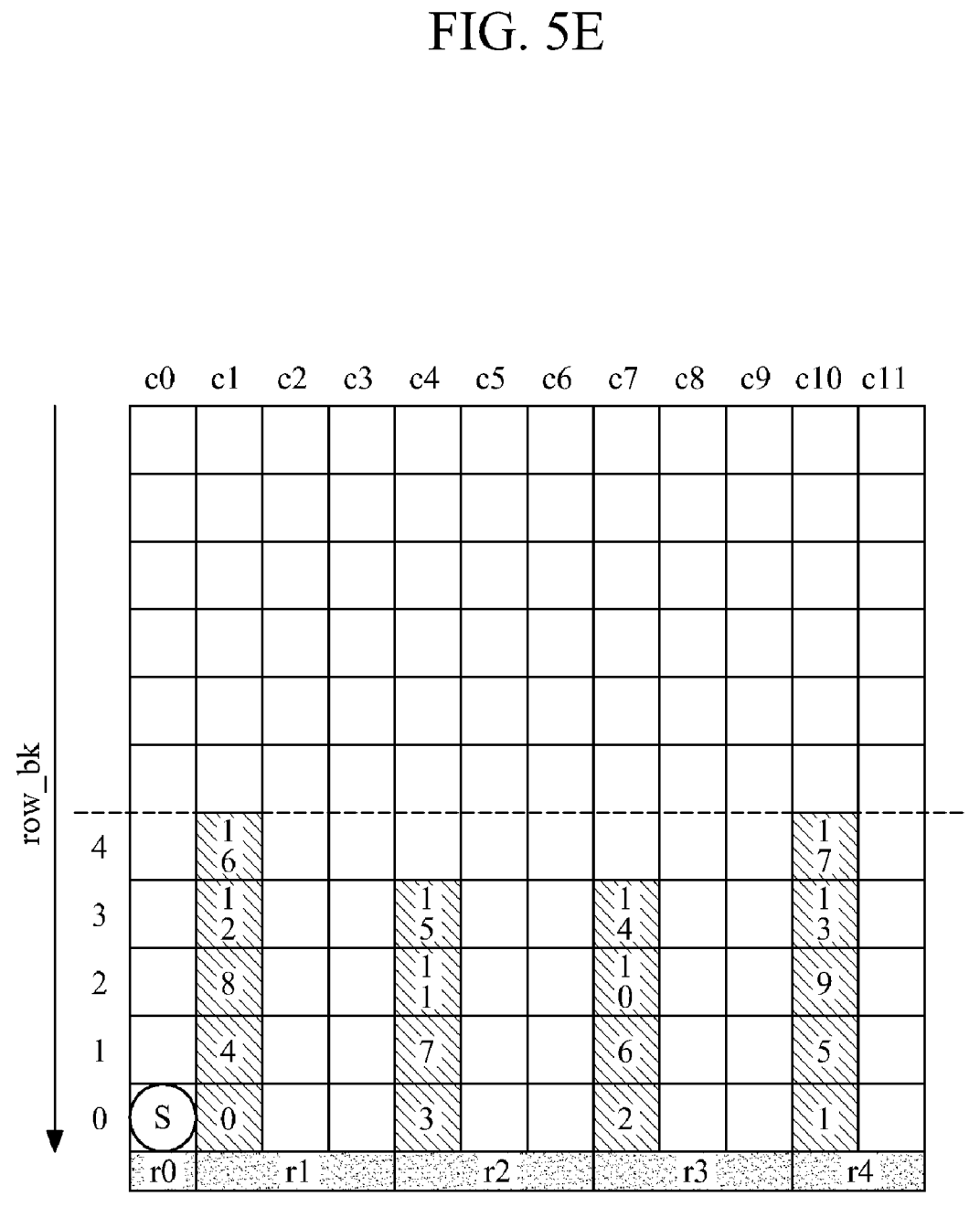
Figure 5F:
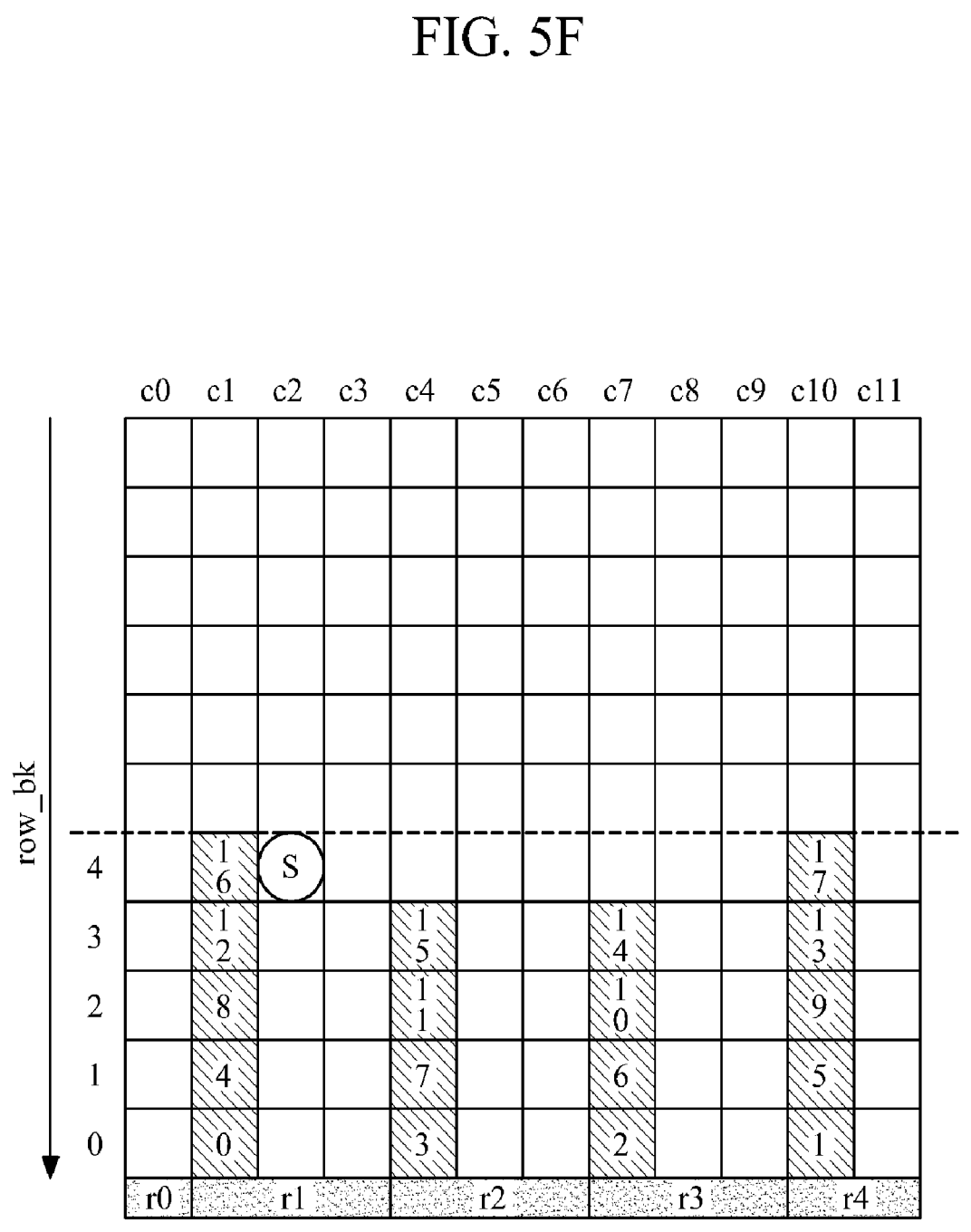

In FIG. 5A, former=0, current=0, skip=0, and acc_skip=0. In FIG. 5B, former=2, current=0, skip=2, and acc_skip=2. In FIG. 5C, former=4, current=0, skip=4, and acc_skip=6. In FIG. 5D, former=4, current=0, skip=4, and acc_skip=10. In FIG. 5E, former=4, current=0, skip=4, and acc_skip=14. In FIG. 5F, former=0, current=1, skip=1, and acc_skip=1. For each column, acc_skip is initialized to zero.

Figure 5G:
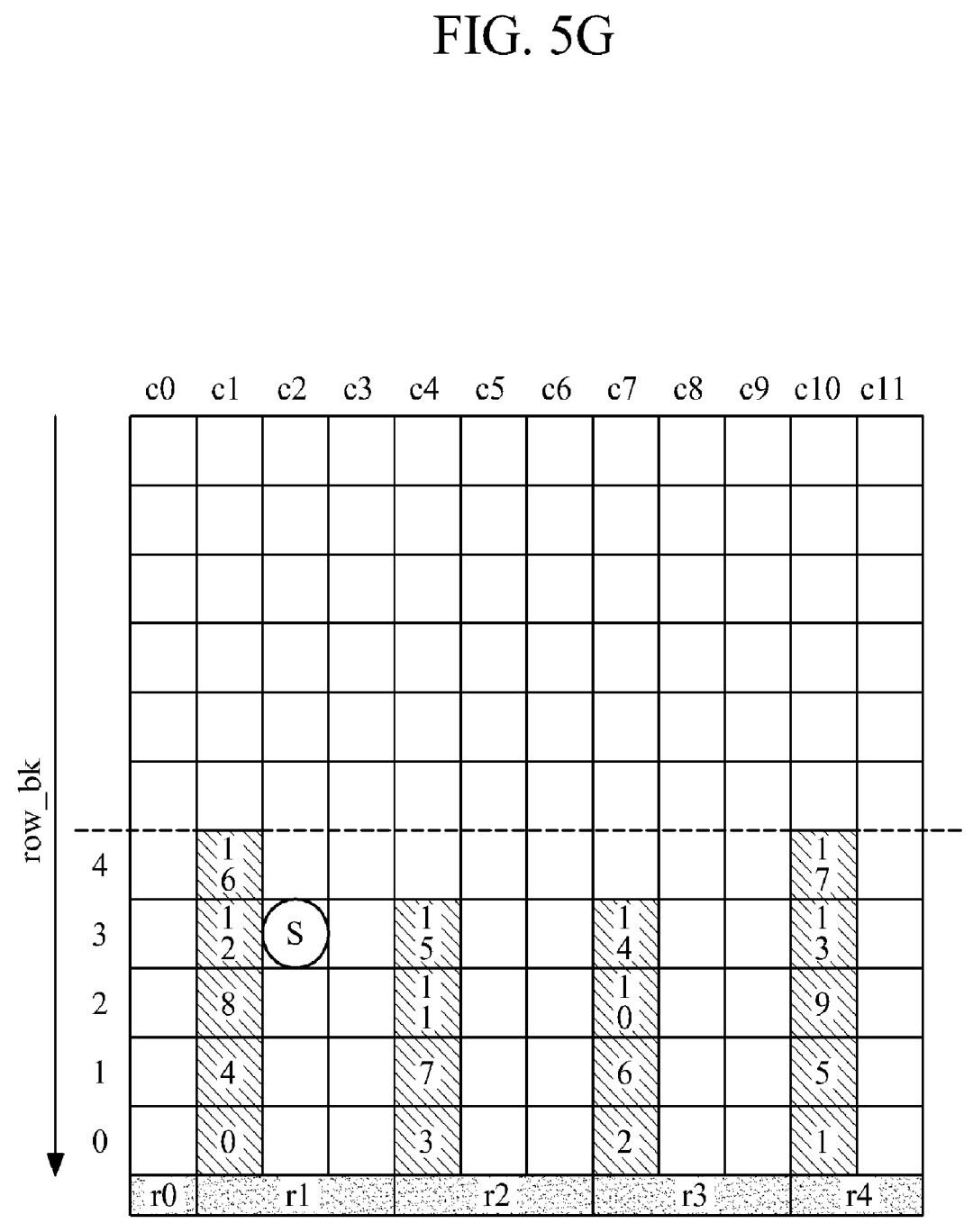
Figure 5H:
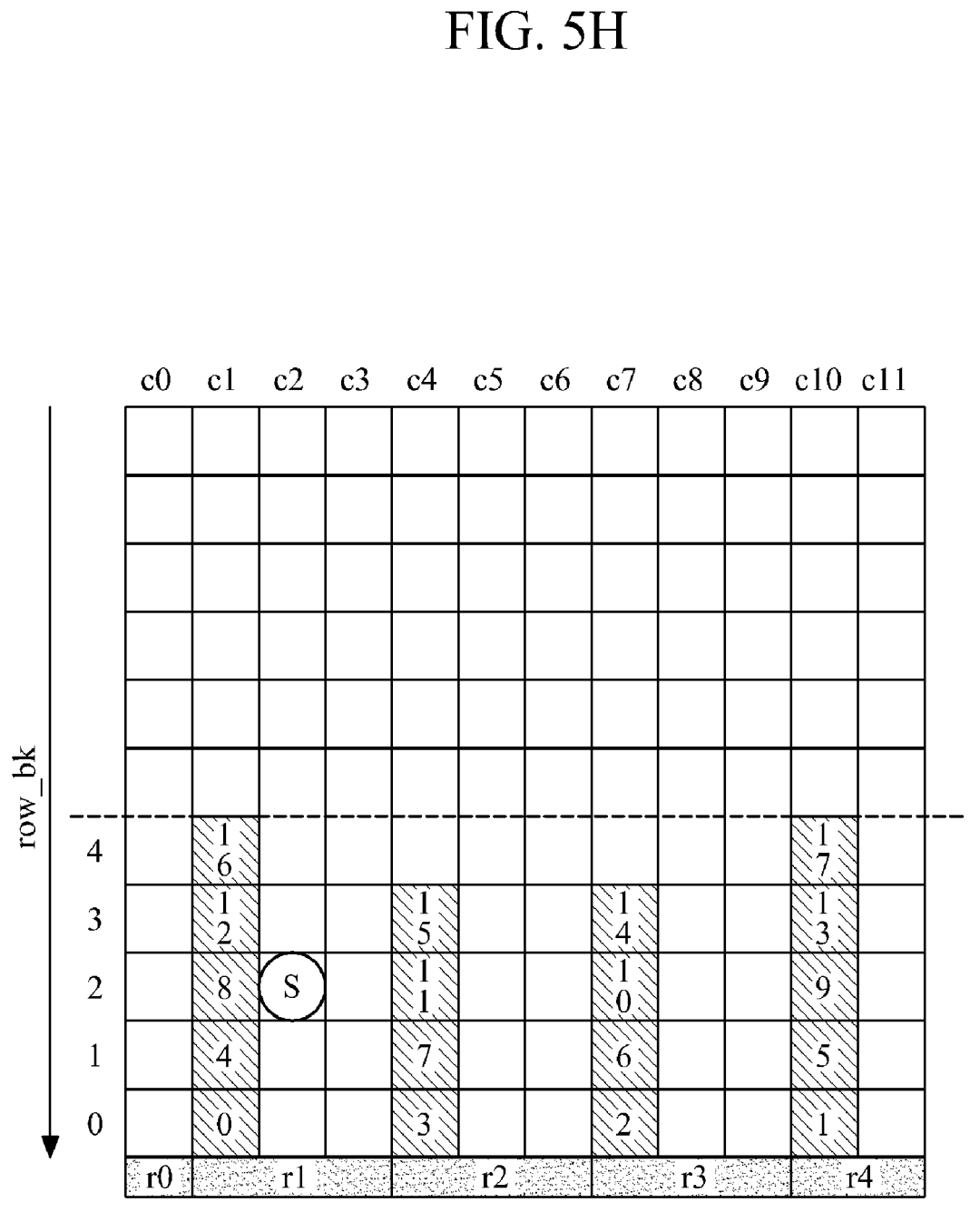

In FIG. 5G, former=1, current=1, skip=2, and acc_skip=3. In FIG. 5H, former=3, current=1, skip=4, and acc_skip=7. In this way, the value of acc_skip can be calculated based on the current element position S.

The CQI data memory read address value is determined by icol+irow*ncol−acc_skip. Here, 'icol' is the column number of the current element position S, 'irow' is the row number of the current element position S, and 'ncol' is the total number of columns.

The SCH data memory read address value is 'icol+irow*ncol−acc_skip−$Q'_{CQI}$' obtained by subtracting the number $Q'_{CQI}=Q/Q_m$ of vector symbols of the encoded CQI data from the CQI data memory read address value.

As described above, the interleaving apparatus 200 for improving transmission performance according to the present invention reads the ACK/NACK data and the RI data from the encoder 100 as soon as the encoder 100 encodes the ACK/NACK data and the RI data since the encoding of the ACK/NACK data and the RI data is relatively simple. On the other hand, since the encoding of the CQI data and the SCH data is relatively complicated, the encoder 100 encodes the CQI data and the SCH data and stores the encoded CQI and SCH data respectively in the CQI memory 150 and the SCH memory 160 in advance. Then, the interleaving apparatus 200 reads the CQI data and the SCH data from respective read address positions determined from the interleaving matrix and interleaves the read CQI and SCH data. Since the interleaving apparatus 200 does not include a memory, delay in signal processing during interleaving can be prevented, thereby improving transmission performance.

Figure 6:
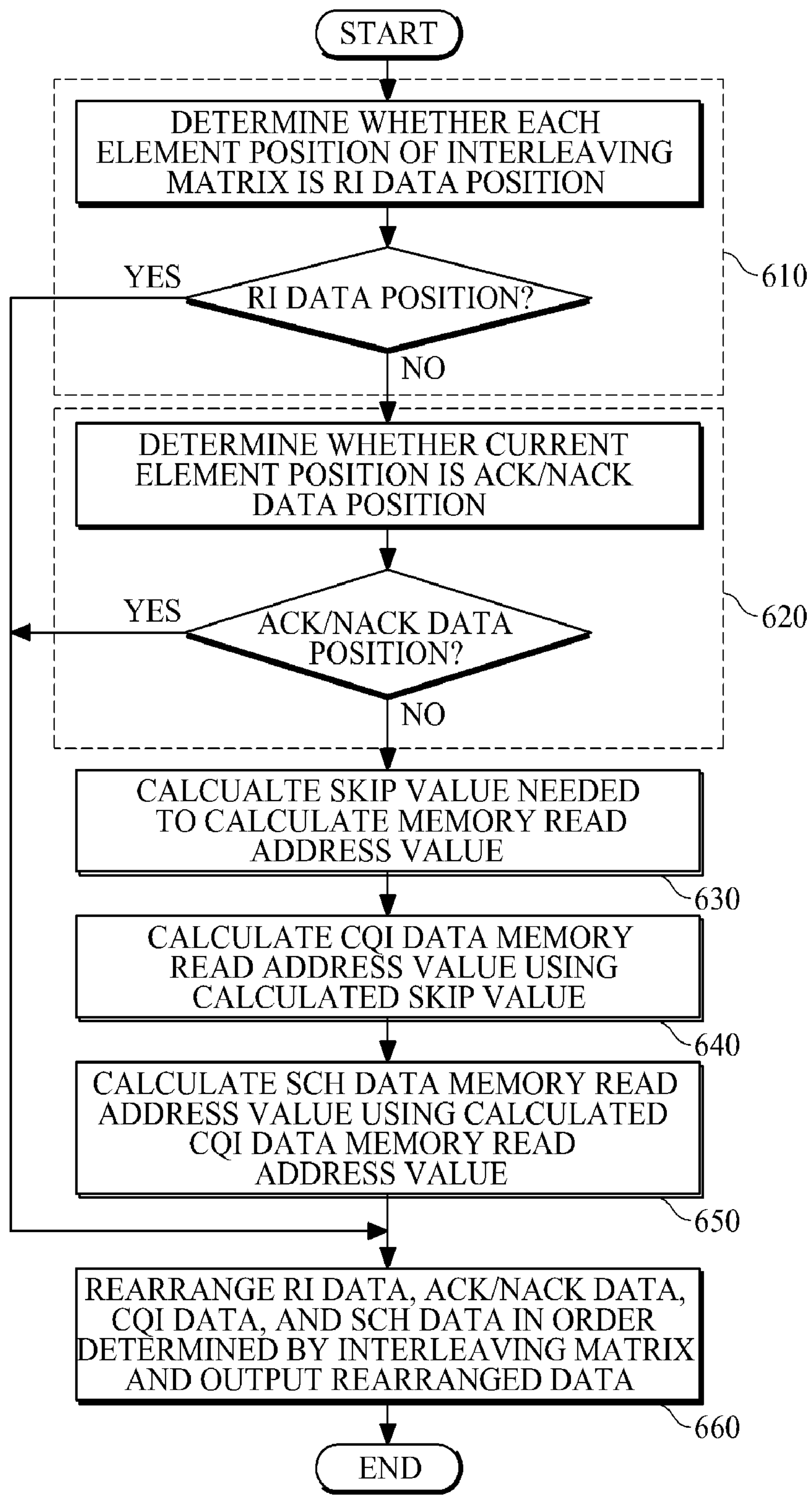
FIG. 6 is a flowchart illustrating an example interleaving method used by the interleaving apparatus of FIG. 3.

The interleaving procedure of the interleaving apparatus 200 illustrated in FIG. 3 will now be described with reference to FIG. 6. FIG. 6 is a flowchart illustrating an example interleaving method used by the interleaving apparatus 200 of FIG. 3.

Referring to FIG. 6, the interleaving apparatus 200 determines whether each element position of an interleaving matrix is an RI data position (operation 610). Since determining whether each element position of the interleaving matrix is the RI data position has been described above, a description thereof will not be repeated.

When it is determined in operation 610 that a current element position is not the RI data position, the interleaving apparatus 200 determines whether the current element position is an ACK/NACK data position (operation 620). Since determining whether the current element position is the ACK/NACK data position has been described above, a description thereof will not be repeated.

When it is determined in operation 620 that the current element position is not the ACK/NACK data position, the interleaving apparatus 200 calculates a skip value needed to calculate a memory read address value (operation 630). Here, the skip value calculated in operation 630 may be the number of pieces of RI data existing at element positions before the current element position of the interleaving matrix. Since calculating of the skip value needed to calculate the memory read address value has been described above, a description thereof will not be repeated.

The interleaving apparatus 200 calculates a CQI data memory read address value using the skip value calculated in operation 630 (operation 640).

The CQI data memory read address value calculated in operation 640 may be a value obtained by multiplying a row number of the current element position by the total number of columns, adding the multiplication result to a column number of the current element position, and subtracting an accumulated skip value from the addition result. Since calculating of the CQI data memory read address value has been described above, a description thereof will be omitted.

Next, the interleaving apparatus 200 calculates a SCH data memory read address value using the CQI data memory read address value calculated in operation 640 (operation 650).

Here, the SCH data memory read address value calculated in operation 650 may be a value obtained by subtracting the number of vector symbols of encoded CQI data from the CQI data memory read address value. Since calculating of the SCH data memory read address value has been described above, a description thereof will not be repeated.

Finally, the interleaving apparatus 200 rearranges RI data, ACK/NACK data, CQI data and SCH data in the order determined by the interleaving matrix and outputs the rearranged data.

Meanwhile, if it is determined in operation 610 that the current element position is the RI data position, the interleaving apparatus 200 reads the RI data as soon as the encoder 100 encodes the RI data (operation 660).

If it is determined in operation 620 that the current element position is the ACK/NACK data, the interleaving apparatus 200 reads the ACK/NACK data as soon as the encoder 100 encodes the ACK/NACK data (operation 660).

The interleaving apparatus 200 reads the CQI data from a CQI data memory position of the encoder 100 which corresponds to the CQI data memory read address value calculated in operation 640 (operation 660).

In addition, the interleaving apparatus 200 reads the SCH data from an SCH data memory position of the encoder 100 which corresponds to the SCH data memory read address value calculated in operation 650 (operation 660).

Then, the interleaving apparatus 200 rearranges the read RI, ACK/NACK, CQI, and SCH data in the order determined by the interleaving matrix and outputs the rearranged data.

Since the interleaving apparatus 200 does not include a memory, a delay in signal processing during interleaving can be prevented, thereby improving transmission performance. Accordingly, the suggested objectives of the present invention can be accomplished.

As described above, an interleaving apparatus according to the present invention does not include a memory. Thus, delay in signal processing can be prevented, resulting in improved transmission performance.

While this invention has been particularly shown and described with reference to exemplary embodiments thereof, it will be understood by those skilled in the art that various changes in form and details may be made therein without departing from the spirit and scope of the invention as defined by the appended claims. The present invention is industrially applicable in the fields of interleaving processing technology and its applications.

What is claimed is:

1. An interleaving apparatus for improving transmission performance, the interleaving apparatus comprising:

a determiner determining the type of data at each element position of an interleaving matrix; and an interleaving processor reading encoded data, which corresponds to the determined type of data at each element position, from an encoder, rearranging the read data in an order determined by the interleaving matrix, and outputting the rearranged data, wherein the determiner comprises:

a rank indication (RI) data determiner determining whether a current element position is an RI data position;

an acknowledgement (ACK)/negative acknowledgement (NACK) data determiner determining whether the current element position is an ACK/NACK data position;

a skip value calculator calculating a skip value needed to calculate a memory read address value when the RI data determiner and the ACK/NACK data determiner determine that the current element position is neither the RI data position nor the ACK/NACK data position;

a channel quality information (CQI) data memory read address calculator calculating a CQI data memory read address value using the skip value calculated by the skip value calculator; and a shared channel (SCH) data memory read address calculator calculating an SCH data memory read address value using the skip value calculated by the skip value calculator.

2. The interleaving apparatus of claim 1, wherein when the RI data determiner determines that the current element position is the RI data position, the interleaving processor reads RI data as soon as the encoder encodes the RI data.

3. The interleaving apparatus of claim 1, wherein when the ACK/NACK data determiner determines that the current element position is the ACK/NACK data position, the interleaving processor reads ACK/NACK data as soon as the encoder encodes the ACK/NACK data.

4. The interleaving apparatus of claim 1, wherein the interleaving processor reads CQI data from a CQI data memory position of the encoder which corresponds to the CQI data memory read address value calculated by the CQI data memory read address calculator.

5. The interleaving apparatus of claim 1, wherein the interleaving processor reads SCH data from an SCH data memory position of the encoder which corresponds to the SCH data memory read address value calculated by the SCH data memory read address calculator.

6. The interleaving apparatus of claim 1, wherein the skip value calculated by the skip value calculator is the number of pieces of RI data existing at element positions before the current element position of the interleaving matrix.

7. The interleaving apparatus of claim 6, wherein the CQI data memory read address value calculated by the CQI data memory read address calculator is a value obtained by multiplying a row number of the current element position by a total number of columns, adding the multiplication result to a column number of the current element position, and subtracting an accumulated skip value from the addition result.

8. The interleaving apparatus of claim 7, wherein the SCH data memory read address value calculated by the SCH data memory read address calculator is a value obtained by subtracting the number of vector symbols of encoded CQI data from the CQI data memory read address value.

9. An interleaving method used by an interleaving apparatus for improving transmission performance, the interleaving method comprising:

determining whether each element position of an interleaving matrix is an RI data position;

determining whether a current element position is an ACK/NACK data position when it is determined that the current element position is not the RI data position;

calculating a skip value needed to calculate a memory read address value when it is determined that the current element position is not the ACK/NACK data position;

calculating a CQI data memory read address value using the calculated skip value;

calculating an SCH data memory read address value using the calculated CQI data memory read address value; and rearranging RI data, ACK/NACK data, CQI data, and SCH data in an order determined by the interleaving matrix and outputting the rearranged data.

10. The interleaving method of claim 9, wherein in the determining of whether each element position is the RI data position, when it is determined that the current element position is the RI data position, the RI data is read as soon as an encoder encodes the RI data in the rearranging and outputting of the RI data, the ACK/NACK data, the CQI data, and the SCH data.

11. The interleaving method of claim 9, wherein, in the determining of whether the current element position is the ACK/NACK data position, when it is determined that the current element position is the ACK/NACK data position, the ACK/NACK data is read as soon as the encoder encodes the ACK/NACK data in the rearranging and outputting of the RI data, the ACK/NACK data, the CQI data, and the SCH data.

12. The interleaving method of claim 9, wherein in the rearranging and outputting of the RI data, the ACK/NACK data, the CQI data, and the SCH data, the CQI data is read from a CQI data memory position of the encoder which corresponds to the CQI data memory read address value calculated in the calculating of the CQI data memory read address value.

13. The interleaving method of claim 9, wherein in the rearranging and outputting of the RI data, the ACK/NACK data, the CQI data, and the SCH data, the SCH data is read from an SCH data memory position of the encoder which corresponds to the SCH data memory read address value calculated in the calculating of the SCH data memory read address value.

14. The interleaving method of claim 9, wherein the skip value calculated in the calculating of the skip value is the number of pieces of RI data existing at element positions before the current element position of the interleaving matrix.

15. The interleaving method of claim 14, wherein the CQI data memory read address value calculated in the calculating of the CQI data memory read address value is a value obtained by multiplying a row number of the current element position by a total number of columns, adding the multiplication result to a column number of the current element position, and subtracting an accumulated skip value from the addition result.

16. The interleaving method of claim 14, wherein the SCH data memory read address value calculated in the calculating of the SCH data memory read address value is a value obtained by subtracting the number of vector symbols of encoded CQI data from the CQI data memory read address value.

* * * * *